United States Patent [19]

Zenker

[11] Patent Number: 4,494,638
[45] Date of Patent: Jan. 22, 1985

[54] SYNCHRONIZING DEVICE, ESPECIALLY FOR THE TRANSMISSION OF A MOTOR VEHICLE

[75] Inventor: Walter Zenker, Bergisch Gladbach, Fed. Rep. of Germany

[73] Assignee: Klöckner-Humboldt-Deutz Aktiengesellschaft, Cologne, Fed. Rep. of Germany

[21] Appl. No.: 365,644

[22] Filed: Apr. 5, 1982

[51] Int. Cl.³ .................. F16D 13/74; F16D 23/02
[52] U.S. Cl. ................. 192/48.91; 192/53 F; 192/113 B
[58] Field of Search ............ 192/53 F, 113 B, 48.91, 192/70.12

[56] References Cited

U.S. PATENT DOCUMENTS

| | | | |
|---|---|---|---|
| 2,106,472 | 1/1938 | Alkman | 192/85 AB |
| 2,289,991 | 7/1942 | Paxman | 192/85 AB X |
| 2,470,208 | 5/1949 | Avila | 192/53 F |
| 4,189,041 | 2/1980 | Muller | 192/53 F |
| 4,267,912 | 5/1981 | Bauer et al. | 192/53 F |
| 4,270,647 | 6/1981 | Leber | 192/113 B |
| 4,287,978 | 9/1981 | Staub | 192/107 R X |

FOREIGN PATENT DOCUMENTS

| | | | |
|---|---|---|---|
| 12685 | 12/1956 | Fed. Rep. of Germany | 192/53 F |
| 2628039 | 2/1977 | Fed. Rep. of Germany | |
| 2855527 | 7/1980 | Fed. Rep. of Germany | |
| 945445 | 1/1964 | United Kingdom | 192/53 F |

Primary Examiner—Rodney H. Bonck
Attorney, Agent, or Firm—Becker & Becker, Inc.

[57] ABSTRACT

A synchronizing device for a transmission, with pocket-like recesses being arranged on those elements, preferably in the clutch- and/or synchronizing ring, which effect synchronization for improved lubrication and cooling of the friction surfaces. The recesses are continuously supplied with oil from a lubricant circuit via an adjoining annular chamber and bores of a shaft carrying the synchronizing device and opening into the annular chamber.

4 Claims, 1 Drawing Figure

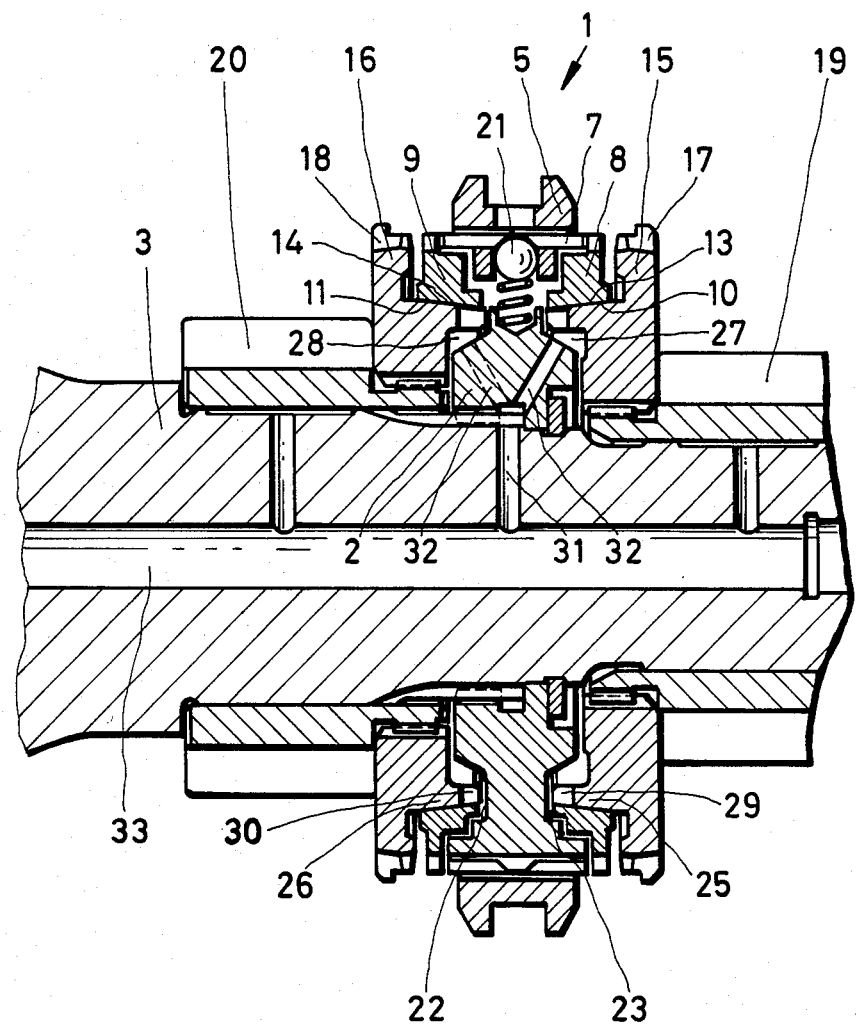

SYNCHRONIZING DEVICE, ESPECIALLY FOR THE TRANSMISSION OF A MOTOR VEHICLE

The present invention relates to a synchronizing device, especially for the transmission of a motor vehicle, according to which an annular gearshift- or control-sleeve carrier is rigidly or non-rotatably arranged on a gear or transmission shaft; a clutch ring is adjacent to the control-sleeve carrier, has a conical friction surface, and is non-rotatably connected to or is constructed unitary with a gear rotatably or loosely mounted on the transmission shaft; this clutch ring, via its friction surface, cooperates with a matching or complementary conical friction surface of a synchronizing or correcting ring.

German Pat. No. 26 28 039 discloses a synchronizing device also having conical friction surfaces provided between the synchronizing and coupling rings, by means of which the adaptation of the peripheral speed to the transmission parts to be brought into synchronization occurs. The wear of the friction surfaces can be kept small by having sufficient lubricant supplied thereto. With the known synchronizing device, the supply of the lubricant is effected from the outside by the use of oil or oil mist centrifuged up within the transmission housing. A reliable oil supply to the friction surfaces, however, is not provided thereby, since the oil coming from the outside to the rotating synchronizing device is immediately centrifuged without having the oil reach the friction surfaces in a sufficient quantity.

German Offenlegungsschrift No. 28 55 527 discloses a synchronizing device according to which a slotted and resilient synchronizing ring is under the influence of blocking means, which increase the servoaction thereof, and which are arranged between the synchronizing ring and the hub of the coupling or clutch body of the gear to be shifted. A gearshift sleeve or control sleeve which is axially shiftable out of a mid-position is seated on a gearshift- or control sleeve carrier; the control sleeve is held in the mid-position by spring-loaded radial centering pins. The centering pins, for feeding lubricant, are connected to the lubricant circuit of the transmission on the shaft side by means of radial and axial bores in the shaft. An additional lubrication of the friction members effecting the synchronization is not provided by the lubricant circuit of the transmission.

It is an object of the present invention, while avoiding the indicated disadvantages, to improve a synchronizing device of the aforementioned general type with simple means so that the friction surfaces of the clutch and synchronizing ring are with certainty always supplied with sufficient lubricant.

This object, and other objects and advantages of the present invention, will appear more clearly from the following specification in connection with the accompanying drawing, which is a fragmentary cross-sectional view of features of one embodiment of a synchronizing device according to the present invention.

The synchronizing device of the present invention is characterized primarily by having several pocket-like recesses, bores, or the like, which are open not only toward the friction surface of the opposing clutch ring but also toward an annular chamber arranged on the synchronizing ring and/or on the clutch ring; the annular chamber is continuously connected with the lubricant circuit of the transmission or variable gear mechanism.

A continuous supply of oil to the friction surfaces of the clutch and synchronizing ring is attained hereby so that the wear at these locations is limited to a minimum. Additionally, a good heat dissipation from the ring surfaces is assured by the continuous oil flow.

According to a further embodiment of the present invention, the annular chamber is formed by hollow spaces or chambers between the gearshift- or control-sleeve carrier and the adjoining clutch ring, whereby the annular chamber is connected with the lubricant circuit by means of bores in the control-sleeve carrier as well as by means of bores in the gear or transmission shaft.

According to a preferred embodiment of the present invention, the gearshift- or control-sleeve carrier, at each end face, has an annular recess for engagement of the clutch- or synchronizing rings, whereby the clutch ring with a shoulder, which forms part of the friction surface of the clutch ring, extends into the vicinity of or close to the gearshift- or control-sleeve carrier; whereby the clutch ring forms the annular chamber with the shoulder opposite a part of the recess of the gearshift- or control-sleeve carrier; and whereby the pocket-like recesses are arranged in the shoulder of the clutch ring.

Finally, for distribution of the oil within the synchronizing device, it is expedient if the bores opening into the annular chambers on both sides of the gearshift- or control-sleeve carrier are alternately displaced or mutually staggered relative to each other and to radial bores connected therewith and located in the transmission shaft, and extend in a V-shaped manner, whereby the oil centrifuged off by the centrifugal force is very precisely brought to the friction surfaces via the pocket-like recesses.

Referring now to the drawing in detail, the synchronizing device 1, illustrated in an axial cross section, has a gearshift- or control-sleeve carrier 2 which is rigidly or non-rotatably arraged on a shaft 3. A gearshift sleeve or control sleeve 5 having teeth 7 projecting on both sides is mounted axially shiftable in a splined gear-tooth system of the control-sleeve carrier 2. A synchronizing or correction ring 8, 9 is respectively mounted on each side of the control sleeve 5. The teeth 7 of the control sleeve 5 engage in locking teeth located on the circumference or periphery of the synchronizing rings 8, 9. Both synchronizing rings 8, 9 have conical friction surfaces 10 or 11, which cooperate with corresponding conical friction surfaces 13 or 14 of two clutch rings 15, 16. Both clutch rings 15, 16 have on their periphery or circumference teeth 17, 18 into which the teeth 7 of the control sleeve 5 engage after synchronization is achieved. Each clutch rings 15, 16 is rigidly or non-rotatably coupled with a respective gear 19 or 20 rotatably mounted on the shaft 3 on both sides of the synchronizing device 1. The gearshift sleeve or control sleeve 5 is held in a mid-position by one or more spring detents 21 installed in the gearshift- or control-sleeve carrier 2. The end faces on both sides of the control-sleeve carrier 2 are provided with recesses 22, 23 into which project not only the synchronizing rings 8, 9, but also the shoulders 25, 26 of the clutch rings 15, 16. At least the shoulders 25, 26 extend to the vicinity of the control-sleeve carrier 2, and respectively form an annular chamber 27 or 28 in the recess 22 or 23. Pocket-like recesses 29 or 30 are arranged in the shoulders 25, 26 while being distributed over the periphery thereof. These pocket-like recesses 29 or 30 are open not only toward the friction surface of the opposed synchronizing ring 8 or 9, but also toward the corresponding annular chamber 27 or 28. Several V-shaped bores 32 are provided in the control-sleeve carrier 2; these bores 32 are displaced or offset relative to each other and to radial bores 31 of the shaft 3 connected therewith; these bores open into the annular chambers 27 or 28. The radial bores 31 are connected to an axial bore 33 in the shaft 3; this bore 33 is connected with the lubricant circuit of the transmission or variable gear mechanism.

During the operation of the transmission, for example by actuating the gearshift sleeve or control sleeve 5 toward the right, there is initially achieved synchronization between the synchronizing ring 8, which is continuously driven by the control-sleeve carrier 2, and the clutch ring 15, with the control sleeve 5 pressing the friction surface 10 of the synchronizing ring 8 more intensively or increasingly against the friction surface 13 of the clutch ring 15, so that finally, at synchronization, the teeth 7 of the control sleeve 5 can engage in the teeth or coupling rim 17 of the clutch ring 15 without any shifting jerk. Naturally, the friction surfaces 10, 13 as well as 11, 14 are strongly loaded during the synchronization, so that a good lubrication or cooling is necessary at these locations. As a result of the continuous connecton of the annular chambers 27, 28 with the lubricant circuit via the bores 31, 32, there is first assured that sufficient oil is always supplied to the annular chambers 27, 28. The guidance of the oil centrifuged by centrifugal force from the annular chambers 27, 28 to the friction surfaces 10, 13 or 11, 14 is considerably improved thereby that the pocket-like recesses 29 or 30 connected with the annular chambers 27, 28 are arranged on the shoulders 25, 26 of the clutch rings 15, 16. The oil is uniformly distributed over the friction surfaces by the pocket-like recesses 29 or 30; the oil serves not only for lubrication thereof, but also for the dissipation of heat.

Naturally the present invention is not restricted to the described embodiment, but can be employed anywhere that the suitable prerequisites exist for a synchronizing device of the mentioned type.

Furthermore, the present invention is in no way restricted to the specific disclosure of the specification and drawing, but also encompasses any modifications within the scope of the appended claims.

What I claim is:

1. A synchronizing device connected to a vehicle transmission lubricant circuit, said device comprising:
   a transmission shaft;
   an annular gearshift-sleeve carrier non-rotatably arranged on said transmission shaft;
   a clutch ring adjacent to said gearshift-sleeve carrier and having a conical, radially outwardly directed friction surface, with an annular chamber being associated with said gearshift-sleeve carrier and said clutch ring and with the annular chamber being in constant communication with said lubricant circuit;
   a gear rigidly associated with said clutch ring and rotatably mounted on said transmission shaft; and
   a synchronizing ring arranged radially outwardly of and around at least a portion of said clutch ring, said synchronizing ring having a corresponding conical friction surface with which said friction surface of said clutch ring cooperates; a plurality of pocket-like recesses being arranged on at least one conical friction surface of said synchronizing ring and said clutch ring respectively, with said pocket-like recesses extending substantially radially through said friction surface as well as being open toward said conical friction surface of the opposing clutch ring and synchronizing ring respectively, as well as also being open toward said annular chamber in constant communication with said lubricant circuit for improved lubrication and cooling of the respective conical friction surfaces over which lubricant accummulation from said pocket-like recesses is distributed where said synchronizing ring and said clutch ring are brought into frictional engagement so that unavoidable wear at said conical friction surfaces can be kept small in that sufficient lubrication is brought between said conical friction surfaces.

2. A synchronizing device according to claim 1, in which said annular chamber is formed by hollow spaces between said gearshift-sleeve carrier and said adjoining clutch ring; and in which said gearshift-sleeve carrier and said transmission shaft are provided with bores for effecting said constant communication with said lubricant circuit.

3. A synchronizing device according to claim 2, in which each axial end face of said gearshift-sleeve carrier is provided with an annular recess for receiving a portion of at least one of said clutch ring and said synchronizing ring; and in which said clutch ring is provided with a shoulder forming part of said friction surface of said clutch ring, said shoulder extending nearly to said gearshift-sleeve carrier in a portion of said annular recess thereof to delimit said annular chamber; with said pocket-like recess being arranged in said shoulder of said clutch ring.

4. A synchronizing device according to claim 3, in which said bores of said gearshift-sleeve carrier open into said annular chamber on both sides of said carrier, and also open into radial bores of said transmission shaft, with said bores of said carrier being alternately staggered to opposite sides of said carrier and extending in a V-shaped manner.

* * * * *